United States Patent [19]

Lee et al.

[11] Patent Number: 4,976,046
[45] Date of Patent: Dec. 11, 1990

[54] MACHINE SETTING GAUGE

[75] Inventors: Leonard G. Lee, Ottawa; Francis A. McLean, Ontario, both of Canada

[73] Assignee: Lee Valley Tools Ltd., Ottawa, Canada

[21] Appl. No.: 335,706

[22] Filed: Apr. 10, 1989

[51] Int. Cl.⁵ .............................................. B27G 23/00
[52] U.S. Cl. ......................................... 33/640; 33/482; 33/202
[58] Field of Search ................... 33/567 IN, 562, 482, 33/563, 565, 626, 201, 262, 534, 633, 634, 640, 641; 83/522.15, 522.16; 229/110; 220/376, DIG. 13

[56] References Cited

U.S. PATENT DOCUMENTS

| 434,073 | 8/1890 | Rondinella | 33/474 |
|---|---|---|---|
| 728,558 | 5/1903 | Eldridge | 33/451 |
| 1,426,658 | 8/1922 | McGuckin | 33/567 |
| 1,672,695 | 6/1928 | Simpson | 33/201 |
| 2,247,362 | 7/1941 | Dibble, Jr. | 33/474 |
| 2,593,914 | 4/1952 | Palitto | 33/482 |
| 2,823,461 | 2/1958 | Schneider | 33/202 |
| 2,913,830 | 11/1959 | Schroter | 33/567 |
| 4,185,391 | 1/1980 | Roley | 33/563 |
| 4,799,354 | 10/1988 | Hill | 33/640 |
| 4,843,728 | 7/1989 | Francis | 33/640 |

FOREIGN PATENT DOCUMENTS 3811861 11/1988 Fed. Rep. of Germany ........ 33/562

Primary Examiner—Thomas B. Will
Attorney, Agent, or Firm—Kilpatrick & Cody

[57] ABSTRACT

A multi-sided gauge and layout tool which includes the five angles needed in order to adjust or set-up woodworking and other machinery to fabricate multi-sided or multi-segmented structures having four, five, six, eight or twelve sides. A large knob with a flat bottom and a slot having a sloping bottom may be removably mounted in the middle of the gauge to facilitate grasping and manipulating the gauge when it is used flat against a work surface and may be removed and used as a base to hold the gauge body upright within the slot.

7 Claims, 1 Drawing Sheet

MACHINE SETTING GAUGE

BACKGROUND OF THE INVENTION

The present invention relates to protractors, squares and gauges for measuring and setting angles between surfaces on machinery, protractors and squares.

It is frequently necessary to adjust the relative angular position of two machine surfaces or of a machine surface with respect to a cutting tool utilized in the machine. While metalworking machinery and industrial quality woodworking machinery frequently include built-in scales or read-out devices which permit such angular positioning to be accomplished reproducibly and with great precision, most woodworking machinery lacks accurate angle setting components. Nevertheless, it frequently is desirable to set woodworking machinery to predetermined angles with substantial precision. For instance, wood objects are frequently fabricated of multiple identical segments with mitered joints. Perhaps the most common example of such objects are rectangular picture frames, but frames, clock faces, turning blanks, and a wide variety of other objects are often fabricated utilizing various numbers of segments. Frequently used numbers of segments are four, five, six, eight and twelve segments.

In order to prepare material for constructing such structures, it is typically necessary to set movable members of a woodworking tool such as a table saw, band saw, radial arm saw, or jointer in order accurately to machine a desired angle on the wood components. Best known among these angles is the 45° angle required in order to make mitered joints on a square or rectangular picture frame or other four-sided structure. Accordingly, because of its frequent use, gauges and miter squares including a 45° angle are widely available. Other less commonly used angles are required, however, in order to set-up a woodworking tool to machine stock for objects fabricated from other multiples of identical segments. This is sometimes accomplished using a machinist's vernier bevel protractor, but this is an expensive instrument often unavailable in a woodworking shop. Typically, the best tools available in a woodworking shop are the rule and protractor head of a combination square used with a sliding bevel gauge. These tools are not well adapted to this application, however, must be set for each desired angle with care and are difficult to use with high accuracy. Paradoxically, although 45° angle gauges and squares are readily available, the tool set-up accuracy required in order to machine components for multi-segment fabrications having more than four segments is greater, rather than less, than that required for a four-segment object, because any error in the angle machined on components is multiplied by the number of components. In short, the more sides involved, the greater the need for accuracy.

Additional problems presented in utilizing previously-available gauges for tool set-up include the difficulty of using many such gauges in an upright position, as distinguished from lying flat on a horizontal table of the machine or tool being adjusted. Many existing protractors and gauges will not remain upright without support in the position necessary, for instance, to set a table saw or radial arm saw blade angle.

In accordance with the convention typically employed in tool-related terminology, reference herein to the "angle" a surface forms to another surface or a designated line means the angle formed between (a) a first imaginary line on that surface and normal to the surface edge and (b) the designated line or an imaginary line on the other surface also normal to the surface edge and intersecting the first imaginary line.

SUMMARY OF THE INVENTION

The present invention is a multi-sided gauge and layout tool which includes in a single tool the five most commonly needed angles in order to adjust or set-up woodworking and other machinery to fabricate multi-sided or multi-segment structures. These angles (measured from one gauge surface to a projection from the adjacent gauge surface) are 45°, 54°, 60°, 67½°, and 75°. These angles or their complements are the angles needed to make figures with 4, 5, 6, 8 and 12 sides, respectively. By arrangement of gauge reference surfaces so that the "corners" or adjacent reference surfaces defining the angles needed for multisided figures having 5, 6, 12, 4 and 8 sides are arranged in that order around the gauge, it is possible to produce a gauge having a desirable shape with reference surfaces of relatively equal size. Such arrangement also causes two of the opposite reference surfaces to be precisely parallel, which substantially facilitate use of the gauge with a radial arm saw. A large knob with a flat bottom and a slot having a sloping bottom and sides normal to the bottom of the knob may be removably mounted in the middle of the gauge to facilitate grasping and manipulating the gauge when it is used flat against a work surface. The knob may also be used as a base to hold the gauge body upright within the slot when the gauge is used, for instance, to set the blade angle in a table saw. The absence of adjustable parts makes it possible to manufacture the gauge with great accuracy economically and makes the tool extremely easy to use since no careful gauge adjustment involving difficult-to-read angle markings is required during use.

It is therefore an object of the present invention to provide an economical gauge for setting machinery at the angles necessary to manufacture components of multi-sided structures having four, five, six, eight or twelve sides.

It is a further object of the present invention to provide a fixed-angle gauge with a stable base capable of holding the gauge in an upright position on a horizontal surface.

These and other objects and benefits of the present invention will be more fully understood by reference to the accompanying drawings, the following description and the claims set forth below.

DETAILED DESCRIPTION OF THE DRAWINGS

Figure 1:
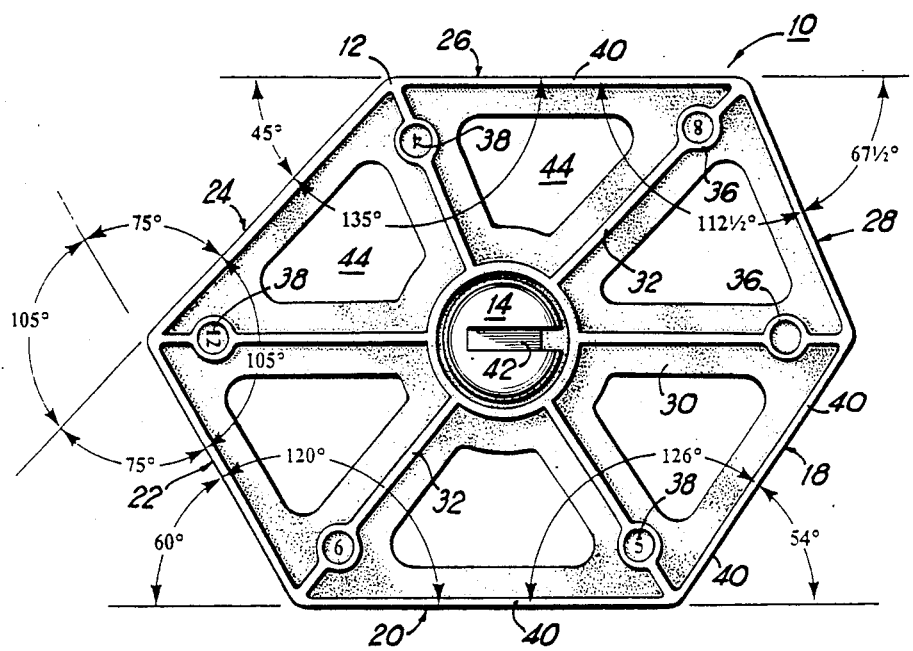
FIG. 1 is a plan view of the multiple-angle gauge of the present invention with the combination knob and base shown positioned for use as a knob.
Figure 2:
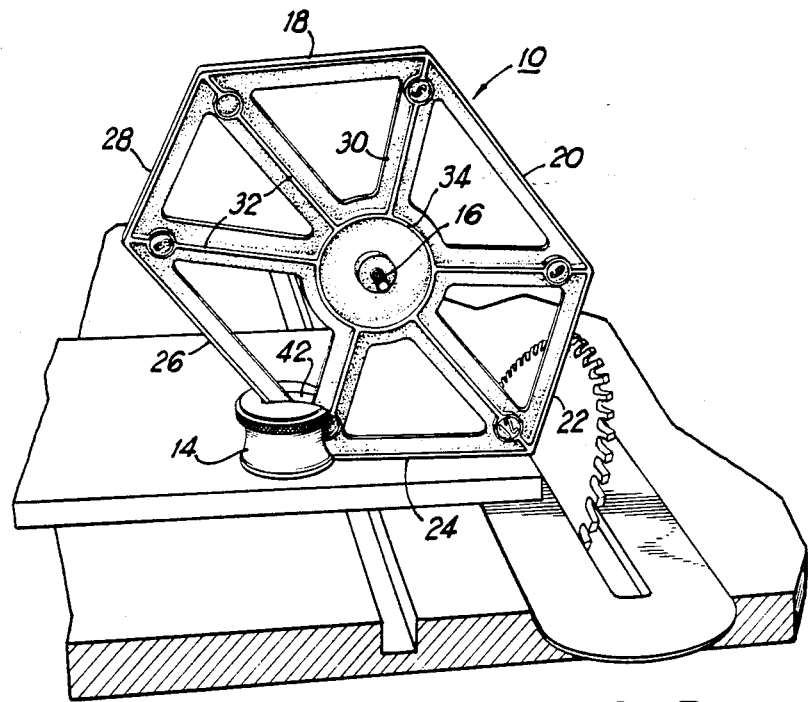
FIG. 2 is a perspective view of a portion of a table saw with the gauge of the present invention shown in an upright position using the knob as a base so the gauge may be used to set saw blade angle.

The multiple-angle gauge 10 of the present invention illustrated in FIGS. 1 and 2 comprises a gauge body 12 and knob 14 which may be attached to the center of the gauge body 12 by receiving a threaded stud 16 (visible in FIG. 2) within a threaded hole (not shown) on the underside of knob 14.

Gauge body 12 may be cast of metal, plastic or other material; machined; or otherwise fabricated to provide a structure having six peripheral reference surfaces 18, 20, 22, 24, 26 and 28. As is illustrated in FIG. 1, the following are the included obtuse angles between the gauge 10 reference surfaces and corresponding number of segments in a multi-segment object producible using the resulting "gauge" angle (the acute angle between the plane of one reference surface and the adjacent reference surface):

| REFERENCE SURFACE | INCLUDED ANGLE BETWEEN REFERENCE SURFACES | NO. OF SIDES |
| --- | --- | --- |
| 18 | | |
| | 126° | 5 |
| 20 | | |
| | 120° | 6 |
| 22 | | |
| | 105° | 12 |
| 24 | | |
| | 135° | 4 |
| 26 | | |
| | 112½° | 8 |
| 28 | | |

As will be apparent by reference to the FIGS., arrangement of the reference surfaces in the relative positions set forth in the above table and illustrated in the FIGS. permits fabrication of a multi-sided gauge with reference surfaces of relatively equal size. The gauge 10 is thus balanced and easy to use, particularly when it must be used in an upright position as is illustrated in FIG. 2.

A sturdy, stable and therefore accurate gauge body 12 may be fabricated as illustrated in the FIGS. utilizing cast aluminum to form a gauge body 12 having a plate 30 reinforced by radial ribs 32, one of which runs from the vicinity of the intersection of each pair of reference surfaces toward the threaded stud 16 and terminates in an upstanding ring 34 encircling stud 16. Islands 36 may be cast adjacent to each intersection of reference surfaces in order to receive markings 38 to identify the number of sides or segments which will be produced utilizing the angle defined by the reference surfaces near the respective island 36. Reference surfaces 18, 20, 22, 24, 26 and 28 are the outer surfaces of reference surface ribs or plates 40 formed at the periphery of plate 30. Roughly triangular cutouts 44 in plate 30 between radial ribs 32 reduce the material in gauge body 12 and make it easier to hold and manipulate the gauge body 12 when the gauge 10 of the present invention is utilized in a upright position such as that illustrated in FIG. 2. Knob 14 may be fabricated by casting or machining it of any suitable material such as brass or plastic in any appropriate desired shape having a stable base surface and a slot of width slightly greater than the width of the gauge body 12 so that a portion of the gauge body 12 may be received in the slot 42 in order to hold the gauge in an upright position as illustrated in FIG. 2.

As should be readily apparent to woodworkers and other keepers of humanity's treasured skills ranging in acuity from the keen, tempered-in-ice intellects of Canadian and New England masters to the languid, grinning wood butchers of the American South, the gauge 10 may be used to set the angle between two vertical machine surfaces by resting the gauge body 12 flat on an adjacent horizontal surface. This approach would be used, for instance, in setting a table saw miter fence relative to the saw blade. Upright use of the gauge 10 to set a table saw blade at a 75° angle with respect to the table is illustrated in FIG. 2. Less immediately apparent are the alternative orientations possible in using the gauge 10 for setting blade-to-table angle on a radial arm saw. In one alternative for setting a radial arm saw blade (which is comparable to the gauge 10 orientation used for setting), the desired angle may be achieved by adjusting the radial arm saw blade against one gauge 10 reference surface while the adjacent surface which defines the desired angle rests on the radial arm saw table. When four, five, six or eight sided objects are to be produced, the gauge 10 may also alternatively be oriented with reference surface 26 or reference surface 20 resting on the radial arm saw table while the blade is adjusted against a reference surface adjacent to the surface opposite the reference surface 26 or 40 which is resting on the radial arm saw table, as the case may be.

As also will be readily appreciated by one of ordinary skill in the art, a variety of fabrication techniques, materials and configurations in addition to those described above may be utilized to achieve the objects of the present invention without departing from the scope and spirit of the invention as described herein and in the following claims.

I claim:

1. A machine setting gauge comprising six reference surfaces joined end to end, the first and second of which are oriented at 126° with respect to each other, the second and third of which are oriented at 120° with respect to each other, the third and fourth of which are oriented at 105° with respect to each other, the fourth and fifth of which are oriented at 135° with respect to each other, the fifth and sixth of which are oriented at 112½° with respect to each other and the first and sixth of which intersect each other.

2. A machine setting gauge comprising a plate having six edges, adjacent pairs of which edges form six angles, five of which angles comprise:

126°,
120°,
105°,
135°, and
112½°.

3. The machine setting gauge of claim 2 further comprising a combination knob and base having a means for attachment to the plate for use as a knob and having a slot within which the plate may be received and held in an upright position when the combination knob and base is used as a base.

4. A machine setting gauge comprising:

(a) a plate,
(b) six peripheral ribs for providing reference surfaces oriented at desired angles with respect to each other and attached at the edges of the plates,
(c) reinforcing ribs running on the plate from the intersections of the peripheral ribs toward the center of the plate,
(d) a threaded stud centrally mounted on the plate, and
(e) a knob which has a threaded hole for receiving the threaded stud and a slot for receiving and holding the plate in an upright position while the knob rests on a substantially horizontal surface when it is desired to use the gauge upright.

5. A machine setting gauge according to claim 4 wherein adjacent pairs of peripheral ribs are oriented at six angles with respect to each other and five of which angles comprise:
126°,
120°,
105°,
135°, and
112½°.

6. A miter square comprising:
(a) body for measuring and setting distinct desired angles between surfaces comprising:
  (i) six rectangular plates joined end to end to provide pairs of reference surfaces oriented at appropriate angles with respect to each other to allow for the measuring and setting of the distinct desired angles,
  (ii) a hub and
  (iii) six spokes, each of which runs between one of the joints between the plates and the hub and
(b) a knob mounted on the hub.

7. A tool comprising:
(a) body for measuring and setting distinct desired angles between surfaces comprising:
  (i) six rectangular plates joined end to end to provide pairs of reference surfaces oriented at appropriate angles with respect to each other to allow for the measuring and setting of the distinct desired angles,
  (ii) a hub and
  (iii) six spokes, each of which runs between one of the joints between the plates and the hub and
(b) a knob mounted on the hub, wherein the knob is detachable and includes a means for holding the body in an upright position with the knob detached and resting on a horizontal surface.

* * * * *